United States Patent [19]
Thomey

[11] Patent Number: 5,722,909
[45] Date of Patent: Mar. 3, 1998

[54] SERIES TYPE DECOUPLING DEVICE

[75] Inventor: Henry W. Thomey, Gilford, Canada

[73] Assignee: Litens Automotive Partnership, Woodbridge, Canada

[21] Appl. No.: 585,596

[22] Filed: Jan. 16, 1996

Related U.S. Application Data

[63] Continuation-in-part of Ser. No. 534,989, filed as PCT/CA95/00335, Jun. 6, 1995, abandoned.

[51] Int. Cl.⁶ ............................................. F16H 7/00
[52] U.S. Cl. ....................................... 474/87; 474/89
[58] Field of Search ........................ 474/69, 73, 74, 474/86, 87, 273, 88, 89; 464/38

[56] References Cited

U.S. PATENT DOCUMENTS

| | | | |
|---|---|---|---|
| 2,658,593 | 11/1953 | Doebeli | 474/73 X |
| 2,866,349 | 12/1958 | Heckethorn | 474/74 X |
| 3,142,202 | 7/1964 | Muhlbeyer | 474/74 X |
| 3,604,279 | 9/1971 | Davis | 474/73 X |
| 3,952,546 | 4/1976 | Nakano et al. | |
| 4,204,589 | 5/1980 | Loker et al. | 192/27 |
| 4,244,455 | 1/1981 | Loker | 192/24 |
| 5,139,463 | 8/1992 | Bytzek et al. | 474/70 X |
| 5,156,573 | 10/1992 | Bytzek et al. | 474/74 |
| 5,219,273 | 6/1993 | Chang | |

FOREIGN PATENT DOCUMENTS

| | | |
|---|---|---|
| A-416872 | 9/1936 | Belgium . |
| A-553471 | 4/1993 | European Pat. Off. . |
| A-2083817 | 12/1971 | France . |
| A-4035583 | 5/1992 | Germany . |
| A-875413 | 8/1961 | United Kingdom . |
| A-907740 | 10/1962 | United Kingdom . |
| WO-A-9110075 | 7/1991 | WIPO . |

*Primary Examiner*—Roger J. Schoeppel
*Attorney, Agent, or Firm*—Cushman Darby & Cushman IP Group of Pillsbury Madison & Sutro LLP

[57] ABSTRACT

A series type decoupler joint includes a driving pulley, a driven pulley and a flexible rubber core coupled therebetween. The driving pulley has an inner hub for mounting onto a shaft and an outer rim for engaging a driving belt. The driven pulley has an inner hub having a bearing assembly for rotatably mounting the inner hub onto the shaft and an outer rim for engaging a driven belt. The flexible rubber core is bonded between the driving pulley and the driven pulley.

32 Claims, 3 Drawing Sheets

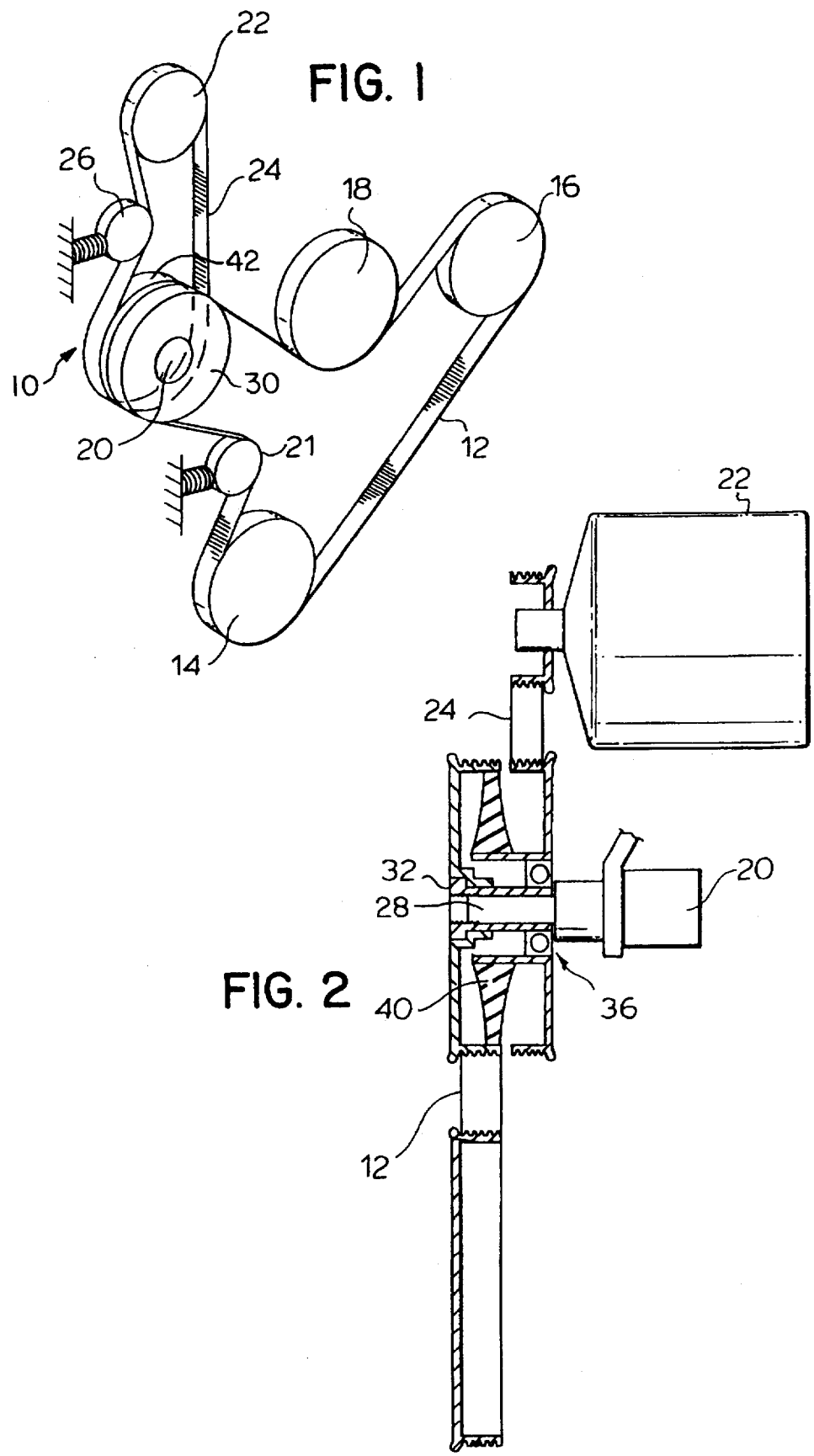

SERIES TYPE DECOUPLING DEVICE

This application is a continuation-in-part application of Ser. No. 08/534,989 filed Sep. 27, 1995, abandoned, which is a continuation-in-part application of PCT/CA 95/00335, filed Jun. 6, 1995 and designating the United States of America.

FIELD OF INVENTION

This invention relates to a series type shaft decoupling device for use in a belt drive having relatively high angular vibrations and where installation space is at a premium. In particular, this invention relates to a torsionally soft coupling which acts as an angular decoupling spring, by which an accessory can be remotely mounted and driven.

BACKGROUND OF INVENTION

In modern automobile engines, belt drives are used to drive various accessories. The elastic belt must transmit sharply varying torque impulses from the drive pulley to a driven pulley which drives an accessory having a high rotational inertia. The sharply varying torque causes the driven inertia to accelerate then decelerate which induces angular vibration of the driven inertia. When this forced vibration coincides with the angular resonant frequency of the drive/belt/driven inertia system, the angular vibration is greatly amplified. The amplified angular vibration causes very large and continuous oscillation in the tensions in each of the belt spans resulting in associated noise and vibration.

Further, space to mount the driven accessory in a plane with the driver pulley and belt has become less and less available forcing designers to mount the accessories away from the plane of the driver.

Devices, known as "decouplers", are commonly used in industry to increase the overall elasticity of the belt driven system by adding a low angular rate decoupler in series with the system. The decoupler may be inserted between the crankshaft hub and the drive pulley or between the driven pulley and the accessory that it drives.

The effects of the decoupler is twofold. First, the lower overall angular rate serves to lower the angular resonant frequency of the entire system. Secondly, the decoupler cushions the drive from the sharp momentary accelerations of the crankshaft.

Ideally, the reduction of the system angular rate is such that the new natural frequency is much lower than the frequency of any rotating load being forced upon it such as the engine firing frequency or the air-conditioning pumping frequency. This avoids resonant amplification during all operating speeds of forces and tensions within the system that might cause disagreeable noise or vibration.

There are problems in the practical application of current decoupling devices. Decoupling devices that are mounted within the crankshaft pulley must transmit the entire accessory load making them quite large and expensive and vulnerable to failure if reduced in size.

The decoupling devices located in the alternator pulley must be quite small because of the small pulley size necessary (about ⅓ of crankshaft pulley diameter) and the limited space available in the region. This has historically led to fatigue failure because the small size forced high working stresses. Moreover, both types require a separate bearing to support the radial loads while allowing limited angular oscillation of the pulley rim relative to the hub.

This bearing has historically been a source of failure because the inner and outer race rotate together while oscillating relative to one another and loaded by the belt tension. The result is a "brinelling" type bearing wear and "pounding" effect due to bearing clearance and the belt hub load.

Accessories are usually driven from the crankshaft pulley, and therefore must be located in the same plane as the crankshaft pulley at the front of the engine. However, because of increasing alternator size and reduced sheet metal clearance, there is often insufficient room to mount all of the accessories at the front of the engine. Even when room is available, the permitted layouts may be so restricted and unsatisfactory that an acceptable drive is not possible.

In an attempt to relieve this problem, the industry has sometimes driven accessories from the back end of the overhead camshaft. Although this may permit space, it has a number of disadvantages. First, the engine must use overhead camshaft and some do not. Secondly, the camshaft turns at one half the crankshaft speed which is too slow so a separate step-up drive is required. This results in an extra pulley and belt and sometimes an extra belt tensioner, raising cost and weight. Thirdly, the accessory imposes added load on the belt or chain which drive the camshaft. Fourthly, an additional seal is required raising the cost and possibility of oil leaks.

SUMMARY OF THE INVENTION

The disadvantages of the prior art may be overcome by taking the driving force directly from the belt via a pulley but then transmitting the resulting torque through the decoupling joint or joints to the driven accessory.

It is desirable to provide a decoupling joint which is sufficiently large to avoid failures found in prior art devices.

It is desirable to provide a decoupling joint which is sufficiently large to achieve a softer angular rate, improving performance.

According to one aspect of the invention, there is provided a series type shaft decoupler joint having a rubber core having a first radius $R_1$ and a first axial length $L_1$ and a second radius $R_2$ and a second axial length $L_2$, with a relationship as follows:

$$L_1 R_1^2 - L_2 R_2^2$$

According to another aspect of the invention, there is provided a series type decoupler joint wherein the rubber core is molded to an inner hub of a driven pulley and an outer hub of a driving pulley, or vice versa.

According to one aspect of the invention, there is provided a series type decoupler joint which includes a driving pulley, a driven pulley and a flexible rubber core coupled therebetween. The driving pulley has an inner hub for mounting onto a shaft and an outer rim for engaging a driving belt. The driven pulley has an inner hub having a bearing assembly for rotatably mounting the inner hub onto the shaft and an outer rim for engaging a driven belt. The flexible rubber core is bonded between the outer rim of the driving pulley and the inner hub of the driven pulley.

DESCRIPTION OF THE DRAWINGS

In drawings which illustrate embodiments of the invention,

FIG. 1 is a perspective view of a typical drive belt configuration of an engine;

FIG. 2 is a side elevational view of drive belt arrangement of FIG. 1;

DETAILED DESCRIPTION OF THE INVENTION

Figure 3:
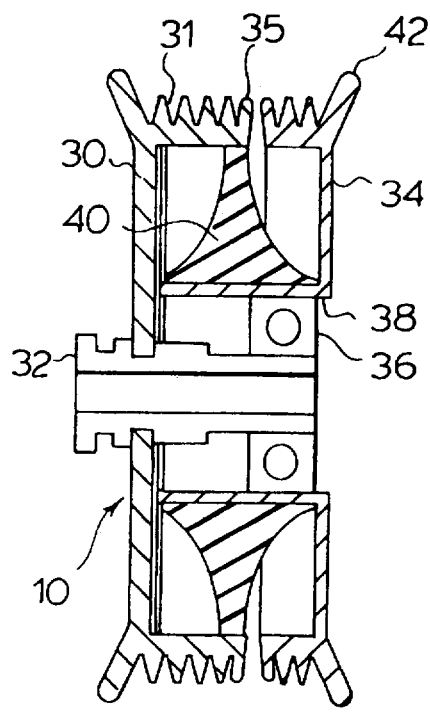
FIG. 3 is a sectional view of a series type decoupling device of the present invention.

Referring to FIGS. 1 and 2, a typical drive belt arrangement is illustrated, incorporating a series type shaft decoupler joint 10 of the present invention is illustrated. The main drive belt 12 serpentines about a crank pulley 14, an air conditioner compressor pump pulley 16, a water pump pulley 18 and a power steering pump pulley 20. A tensioner 21 tensions belt 12 in a manner well known in the art.

An alternator 22 is driven by a secondary belt 24 which is driven via the series type decoupler joint 10 of the present invention. Secondary belt 24 has a tensioner 26 mounted to tension belt 24 in a manner well known in the art.

Referring to FIG. 3, the series type shaft decoupler joint 10 is illustrated in greater detail. The decoupler joint 10 is mounted on a drive shaft of the power steering pump 20. A first driving pulley 30 has a hub for mounting onto the shaft. Pulley 30 is mounted on sleeve 32 in a frictional fit. Sleeve 32 is mountable on a drive shaft for rotation therewith. Pulley 30 has a plurality of v-shaped grooves 31 in the outer rim 33 for engaging the driving belt 12.

The decoupler joint 10 also has a second drive pulley 34. Pulley 34 is rotatably mounted on shaft 28 via bearing assembly 36. Bearing assembly 36 is also mounted on sleeve 32 in a frictional fit. Pulley 34 has an elongated inner hub 38 which extends into the axial length of pulley 30 to be nested therein. Pulley 34 has a plurality of v-shaped grooves in the outer rim 42 for engaging the driven belt 24.

A flexible rubber core 40 extends between and is bonded to the inner hub 38 and an inner circumferential face of rim 35 for elastically coupling pulley 30 to pulley 34.

Figure 4:
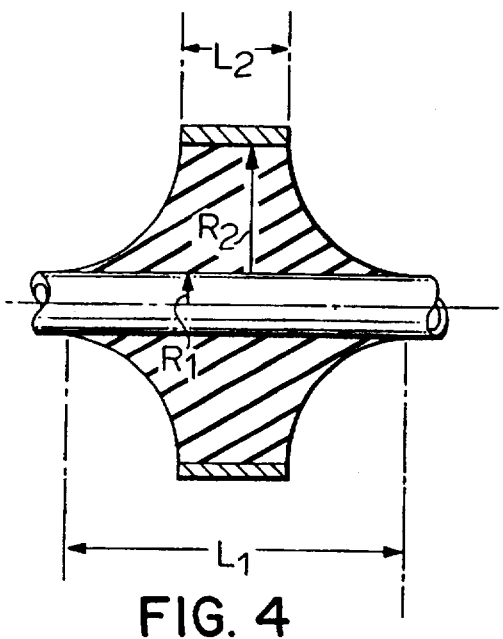
FIG. 4 is a partial sectional view illustrating the required ratios of the decoupling joint of the embodiment of FIG. 3.

Referring to FIG. 4, the general geometry of the flexible rubber core is illustrated. The flexible rubber core 40 has an inner length $L_1$ and a radius $R_1$ and an outer length $L_2$ and a radius $R_2$.

The sizing and selection of the rubber core 40 is made according to the following relations:

$$a = L_1 R_1^2 = L_2 R_2^2$$

$$K = \frac{0.048 Sa}{\log_{10} \frac{R_2}{R_1}}$$

$$f = \frac{0.159 T}{a} \text{ (constant)}$$

where

K—Torsional spring rate [in.lb per degree]
T—Torque [in.lb]
S—Shear Modulus of rubber [p.s.i.]
f—shear stress in torsional shear [p.s.i.]
R—radius of rubber [in]
L—is length of rubber, parallel to axis [in]

The ratio between the radius of the outer hub to the radius of the inner hub, $R_2:R_1$, must be sufficiently large to reduce the resonant frequency of the system below the operating frequency and to minimize fatigue failure. In the present embodiment, the ratio $R_2:R_1$ must exceed 2:1, and is preferably about 3:1. Since the product $LR^2$ must be a constant, the length of the inner hub greatly exceeds the length of the outer hub. In practice, the outer ends of $L_1$ may be truncated to a small degree at this portion of the core 40 transmits only a small percentage of the rotational forces.

The two pulleys 30 and 34 are mounted side-by-side on sleeve 32. In order to economize on space and still achieve the length $L_1$, the two pulleys 30 and 34 are nested within each other. The inner hub 38 of pulley 34 extends within the outer rim 35 of pulley 30.

In use, driving belt 12 will rotate driving pulley 30 which will cause shaft 28 to rotate the power steering pump 20. Rotational forces will also be transmitted through the flexible rubber core 40 to inner hub 38 causing driven pulley 34 to rotate, providing the driving force for driven belt 24 for rotating alternator 22.

By using the series type decoupling device 10 of the present invention, additional accessories may be driven yet the designer is able to move such accessories to an area where greater space is available.

Although a specific arrangement has been illustrated, it can now be readily understood that the present invention can be utilized in any accessory belt drive application or arrangement.

Figure 5:
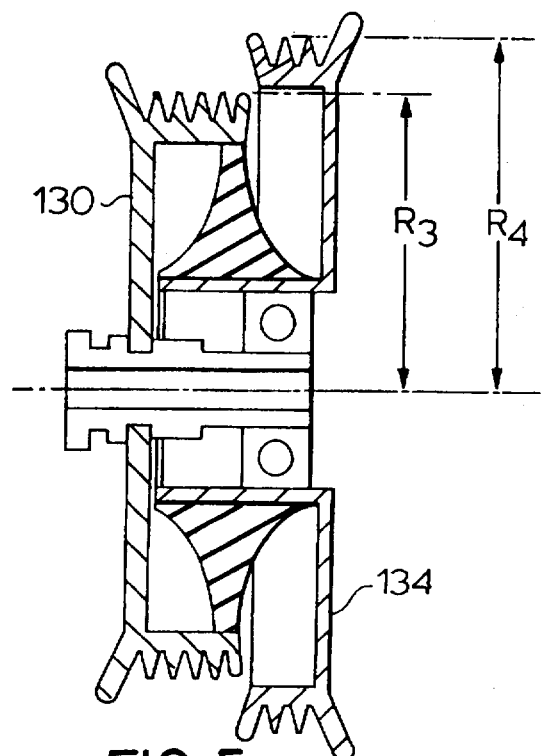
FIG. 5 is a sectional view of a step up series type decoupler of the present invention.

Referring to FIG. 5, a second embodiment of the series type decoupler device of the present invention has been illustrated. In this embodiment, different diameter pulleys 130 and 134, $R_2$ and $R_1$, respectively have be used. The size of diameters depends on the power to be transferred and the speed of the driven belt. This arrangement is particularly useful in driving an alternator where high rotation speeds are necessary for efficient operation. The increased diameter of pulley 134 will rotate an alternator without having to reduce the size of the alternator pulley.

Figure 6:
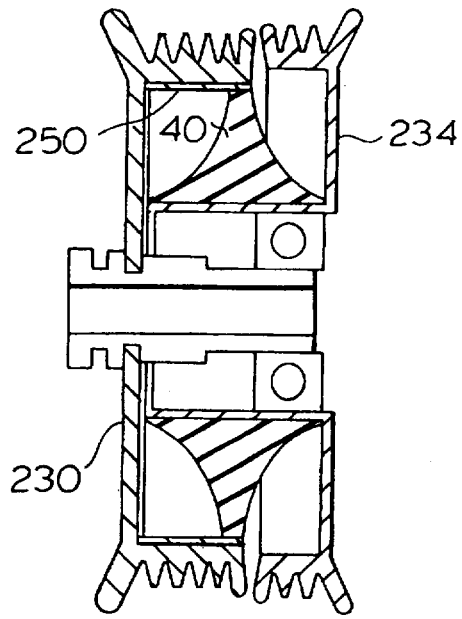
FIG. 6 is a sectional view of the decoupling joint of FIG. 3 incorporating a one-way clutch.
Figure 7:
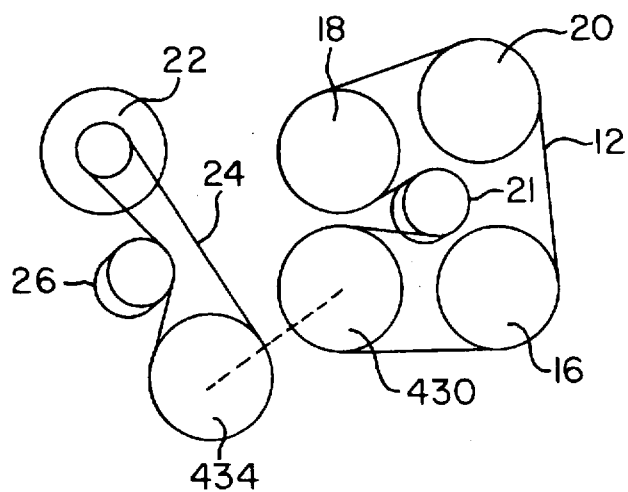
FIG. 7 is a front elevational view of a typical drive belt configuration of an engine incorporating a fourth embodiment of a series type decoupling device of the present invention.

Referring to FIG. 6, a third embodiment of the series type decoupler device of the present invention is illustrated. In this embodiment a one-way clutch 250 is interposed between pulley 230 and rubber core 40. The clutch 250 comprises of an over-running clutch band which has the rubber core 40 bonded thereto. The clutch 250 minimizes excessive forces from being transmitted.

Figure 8:
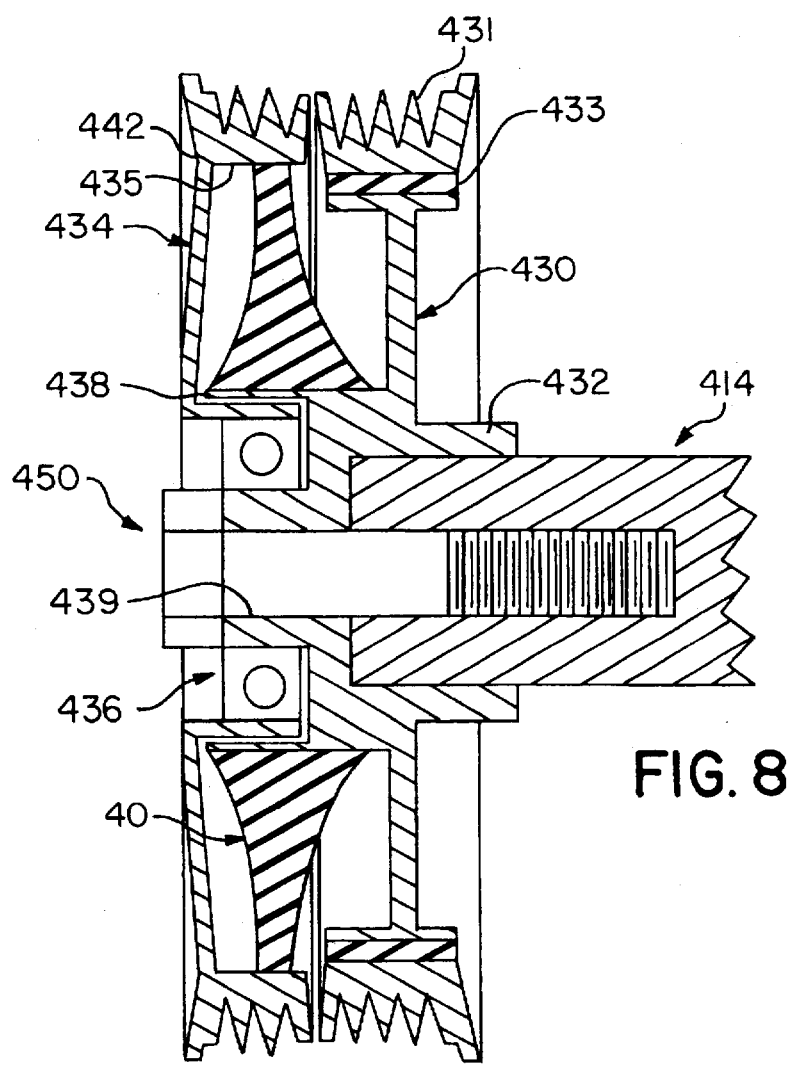
FIG. 8 is a sectional view of a fourth embodiment of a series type decoupling joint of FIG. 7.

Referring to FIG. 8, a fourth embodiment of the series type shaft decoupler joint 10 of the present invention is illustrated. The decoupler joint 400 is mounted on a crankshaft 414. A first driving puller 400 has a hub 432 for mounting onto the shaft. Hub 432 is mountable on a crankshaft 414 for rotation therewith. Pulley 430 has a plurality of v-shaped grooves 431 in the outer rim 433 for engaging the driven belt 12.

Hub 432 of pulley 430 has an axially elongated inner flange 438 and a stepped concentric core ring 439 which extends into the axial length of pulley 434 to be nested therein. Pulley 434 is rotatably mounted on hub 432 via bearing assembly 436 which is frictionally mounted on ring 439. Pulley 434 has a plurality of v-shaped grooves in the outer rim 442 for engaging the driven belt 24.

A flexible rubber core 40 extends between and is bonded to the inner hub 432 on flange 438 and an inner circumferential face of rim 435 for elastically connecting the driving pulley 430 to driven pulley 434.

In use, the series type decoupler 400 is mounted on the crankshaft 414 by attachment bolt 450. The main drive belt 12 is driven by pulley 430. Since pulley 430 is closer to the engine block, the accessories being drive may also be fitted closer to the engine block. The driven pulley 434 drives belt 24 which drives the alternator 22. The alternator 22 may be spaced relatively further from the engine block to be in proper alignment with the belt 24.

The alternator 22 is thus decoupled from the accessories being driven by the main drive belt 12. By decoupling the alternator 22, the probability of belt slip squeak at start up and shut down is greatly reduced since the load on the belt is only about ¼ of the loads being driven by both belts. Locating the spring on the crankshaft, where the engine driving forces are being applied permits the rubber core 40 to be 6 to 9 times stiffer given the same amount of decoupling. A stiffer rubber core increases the durability thereof.

Although the disclosure describes and illustrates the preferred embodiments of the invention, it is understood that the invention is not limited to these particular embodiments. Many variations and modifications will now occur to those skilled in the art. For definition of the invention, reference is made to the appended claims.

We claim:

1. A series type decoupler joint comprising
   a driving pulley,
   a driven pulley,
   a sleeve for mounting said decoupler joint on a shaft, said driving pulley and said driven pulley mounted on said sleeve with said driving pulley engaging said sleeve for rotation therewith and said driven pulley rotatably engaging said sleeve, and
   a flexible rubber core extending between said driving pulley and said driven pulley for elastically coupling said driving pulley to said driven pulley.

2. A series type decoupler joint as claimed in claim 1 wherein said rubber core has an inner axial length $L_1$ and an outer axial length $L_2$, said first axial length $L_1$ being greater than said second axial length $L_2$.

3. A series type decoupler joint as claimed in claim 1 wherein said rubber core has an outer radius $R_2$ and an inner radius $R_1$, wherein said outer radius $R_2$ to said inner radius has a ratio greater than 2:1.

4. A series type decoupler joint as claimed in claim 1 wherein said rubber core has an outer radius $R_2$ and an inner radius $R_1$, wherein said outer radius $R_2$ to said inner radius has a ratio of about 3:1.

5. A series type decoupler joint as claimed in claim 3 wherein said inner radius $R_1$ and said inner axial length $L_1$ and said outer radius $R_2$ and said outer axial length $L_2$ have a relationship as follows:

$$L_1 R_1^2 = L_2 R_2^2.$$

6. A series type decoupler joint as claimed in claim 5 wherein said rubber core has concave end faces.

7. A series type decoupler as claimed in claim 1 wherein each of said pulleys has an outer rim having v-shaped grooves thereon.

8. A series type decoupler as claimed in claim 7 wherein said driven pulley has a diameter substantially the same as a diameter of said driving pulley.

9. A series type decoupler as claimed in claim 1 wherein one of said driving pulley and said driven pulley is nested within the other of said driving and driven pulley.

10. A series type decoupler as claimed in claim 1 wherein said driving pulley has a diameter greater than a diameter of said driven pulley.

11. A series type decoupler as claimed in claim 1 wherein said flexible rubber core is bonded to an inner circumferential face of a rim of said driving pulley and to an inner hub of said driven pulley.

12. A series type decoupler joint as claimed in claim 11 wherein said inner hub of said driven pulley extends into said driving pulley to be nested therein.

13. A series type decoupler as claimed in claim 1 wherein said decoupler further comprises a one-way clutch interposed between an inner circumferential surface of said rim of said driving pulley and said flexible rubber core.

14. A series type decoupler as claimed in claim 13 wherein said one-way clutch comprises an over-running clutch band.

15. A series type decoupler joint as claimed in claim 1 wherein said flexible rubber core extends between an inner circumferential surface of a rim of one of said driving and driven pulley and an inner hub of the other of said driving and driven pulley.

16. A series type decoupler as claimed in claim 15 wherein one of said driving pulley and said drives pulley is nested within the other of said driving and driven pulley.

17. A series type decoupler as claimed in claim 15 wherein said driving pulley has a diameter greater than a diameter of said driven pulley.

18. A series type decoupler joint comprising:
   a driving pulley having an inner hub for mounting onto a shaft and an outer rim for engaging a driving belt,
   a driven pulley having an inner hub having means for rotatably mounting said inner hub onto the shaft and an outer rim for engaging a driven belt, and
   a flexible rubber core extending between said outer rim of said driving pulley and said inner hub of said driven pulley, wherein said driving pulley and said driven pulley are in a side-by-side relation.

19. A series type decoupler joint as claimed in claim 18 wherein said inner hub of said driven pulley extends into said driving pulley to be nested therein.

20. A series type decoupler joint comprising
   a driving pulley having an inner hub for mounting said decoupler joint on a shaft, and
   a driven pulley rotatably mounted on said inner hub, said driving pulley being nested within said driven pulley, and
   a flexible rubber core extending radially between said inner hub of said driving pulley and an outer rim of said driven pulley for elastically coupling said driving pulley to said driven pulley.

21. A series type decoupler as claimed in claim 20 wherein said driving pulley has a diameter greater than a diameter of said driven pulley.

22. A series type decoupler as claimed in claim 20 wherein said inner hub has an inner core ring engaging a bearing for rotatably receiving an inner hub of said driven pulley and a flange concentrically extending over said bearing for engaging said rubber core.

23. A series type decoupler joint as claimed in claim 20 wherein said rubber core has an inner axial length $L_1$ and an outer axial length $L_2$, said first axial length $L_1$ being greater than said second axial length $L_2$.

24. A series type decoupler joint as claimed in claim 20 wherein said rubber core has an outer radius $R_2$ and an inner radius $R_1$, wherein said outer radius $R_2$ to said inner radius has a ratio greater than 2:1.

25. A series type decoupler joint as claimed in claim 20 wherein said rubber core has an outer radius $R_2$ and an inner radius $R_1$, wherein said outer radius $R_1$ to said inner radius has a ratio of about 3:1.

26. A series type decoupler joint as claimed in claim 25 wherein said inner radius $R_1$ and said inner axial length $L_1$ and said outer radius $R_2$ and said outer axial length $L_2$ have a relationship as follows:

$$L_1 R_1^2 = L_2 R_2^2.$$

27. A series type decoupler joint as claimed in claim 26 wherein said rubber core has concave end faces.

28. An engine for a motor vehicle comprising:

a rotatable drive shaft having an associated pulley assembly mounted thereon;

a plurality of rotatable driven shafts for driving various components for the motor vehicle including an alternator, each of said driven shafts having an associated pulley assembly mounted thereon;

at least a designated one of said shafts having said associated pulley assembly mounted thereon constituting a decoupler joint, said decoupler joint comprising separate first and second pulley members carried by a mounting sleeve, said first and second pulley members being rotatably coupled to one another by a resilient member, said first pulley member fixedly mounted with respect to said designated shaft, and said second pulley member being mounted for instantaneous rotational movement relative to said designated shaft, said rotational movement being limited by said resilient member coupled between said first and second pulley members, a first endless flexible belt trained about a first set of pulley assemblies, including the pulley assembly mounted on said drive shaft, a second endless flexible belt trained about a second set of pulley assemblies, including the pulley assembly mounted on the driven shaft for the alternator, and said first endless flexible belt being trained about said first pulley member, and said second endless flexible belt trained about said second pulley member.

29. An engine according to claim 28 wherein said first set of pulley assemblies includes, in addition to the pulley assembly mounted on the drive shaft, pulley assemblies mounted on each of a driven shaft for a water pump, a driven shaft for a compressor, and a driven shaft for a power steering pump, and wherein said second set of pulley assemblies includes, in addition to the pulley assembly mounted on the driven shaft for the alternator, and the driven shaft for a power steering pump, said decoupler joint being mounted on the driven shaft of said power steering pump.

30. An engine according to claim 28, wherein said mounting sleeve is constructed and arranged to mount said first pulley member, said second pulley member, and said resilient member therebetween as a unitary assembly on one of the driven shafts.

31. An engine according to claim 30, wherein said second pulley member has a annular hub member disposed in surrounding relation to said sleeve member, and further comprising a ball bearing assembly disposed between said sleeve member and said hub member, said ball bearing assembly mounted said second pulley member for said instantaneous rotational movement.

32. An engine according to claim 31, wherein said resilient member is made from a rubber material and is connected to said hub member of said second pulley member and to an outer belt engaging rim of said first pulley member.

* * * * *